US011535317B2

(12) United States Patent
Di Biase

(10) Patent No.: US 11,535,317 B2
(45) Date of Patent: Dec. 27, 2022

(54) FRAME, UNDERCARRIAGE AND RADIO-CONTROLLED VEHICLE

(71) Applicant: MDB S.R.L. Con Socio Unico, Lanciano (IT)

(72) Inventor: Mario Di Biase, Lanciano (IT)

(73) Assignee: MDB S.R.L. Con Socio Unico, Lanciano (IT)

( * ) Notice: Subject to any disclaimer, the term of this patent is extended or adjusted under 35 U.S.C. 154(b) by 206 days.

(21) Appl. No.: 16/500,992

(22) PCT Filed: Apr. 4, 2018

(86) PCT No.: PCT/IB2018/052332
§ 371 (c)(1),
(2) Date: Oct. 4, 2019

(87) PCT Pub. No.: WO2018/185682
PCT Pub. Date: Oct. 11, 2018

(65) Prior Publication Data
US 2020/0031408 A1 Jan. 30, 2020

(30) Foreign Application Priority Data
Apr. 4, 2017 (IT) .................. 102017000036800

(51) Int. Cl.
*B62D 55/084* (2006.01)
*B62D 21/02* (2006.01)
*B62D 55/06* (2006.01)
*B62D 55/10* (2006.01)
*B62D 55/125* (2006.01)
(Continued)

(52) U.S. Cl.
CPC ........... *B62D 55/084* (2013.01); *B62D 21/02* (2013.01); *B62D 55/06* (2013.01); *B62D 55/10* (2013.01);
(Continued)

(58) Field of Classification Search
CPC ...... B62D 55/08; B62D 55/084; B62D 55/06; B62D 55/10; B62D 55/125; B62D 55/14; B62D 55/24; B62D 55/305
See application file for complete search history.

(56) References Cited

U.S. PATENT DOCUMENTS 4,151,920 A * 5/1979 Shoup .................... B62D 55/10
280/781
4,431,074 A * 2/1984 Langerud ............. B62D 55/084
180/9.48
(Continued)

FOREIGN PATENT DOCUMENTS

| EP | 2221240 A1 | 8/2010 |
| EP | 2905056 A1 | 8/2015 |
| WO | 2010020608 A1 | 2/2010 |

OTHER PUBLICATIONS

International Search Report dated Aug. 22, 2018 for PCT application No. PCT/IB2018/052332.
(Continued)

*Primary Examiner* — Jacob D Knutson
*Assistant Examiner* — Abigail R Hymel
(74) *Attorney, Agent, or Firm* — Ruggiero McAllister & McMahon LLC

(57) ABSTRACT

A radio-controlled vehicle having a frame, a left undercarriage and a right undercarriage; wherein the frame has a front guide and a rear guide, each configured to house a respective cylinder; each undercarriage having a front slide and a rear slide, which are connected in a sliding manner to the front guide and to the rear guide, respectively; wherein each cylinder is configured to selectively vary the distance between the longitudinal axis of the frame and the longitudinal axis of each undercarriage; wherein each undercarriage comprises an anti-derailment plate.

5 Claims, 7 Drawing Sheets

(51) Int. Cl.
*B62D 55/14* (2006.01)
*B62D 55/24* (2006.01)
*B62D 55/30* (2006.01)
*G05D 1/00* (2006.01)

(52) U.S. Cl.
CPC ........... *B62D 55/125* (2013.01); *B62D 55/14* (2013.01); *B62D 55/24* (2013.01); *B62D 55/305* (2013.01); *G05D 1/0022* (2013.01); *G05D 2201/0213* (2013.01)

(56) References Cited

U.S. PATENT DOCUMENTS

| | | | | | |
|---|---|---|---|---|---|
| 5,489,114 | A | * | 2/1996 | Ward | B60B 35/109 |
| | | | | | 280/638 |
| 6,145,610 | A | * | 11/2000 | Gallignani | B62D 55/084 |
| | | | | | 180/9.48 |
| 2001/0004951 | A1 | * | 6/2001 | Pertusi | B62D 55/10 |
| | | | | | 180/291 |
| 2009/0065270 | A1 | * | 3/2009 | Bordini | B62D 55/06 |
| | | | | | 180/9.1 |
| 2009/0229894 | A1 | * | 9/2009 | Roucka | E02F 9/024 |
| | | | | | 180/9.48 |
| 2013/0284525 | A1 | * | 10/2013 | Allaire | B62D 55/305 |
| | | | | | 180/9.1 |
| 2014/0110183 | A1 | * | 4/2014 | Rudakevych | G05D 1/0022 |
| | | | | | 180/68.5 |

OTHER PUBLICATIONS

Written Opinion dated Aug. 22, 2018 for PCT application No. PCT/IB2018/052332.

* cited by examiner

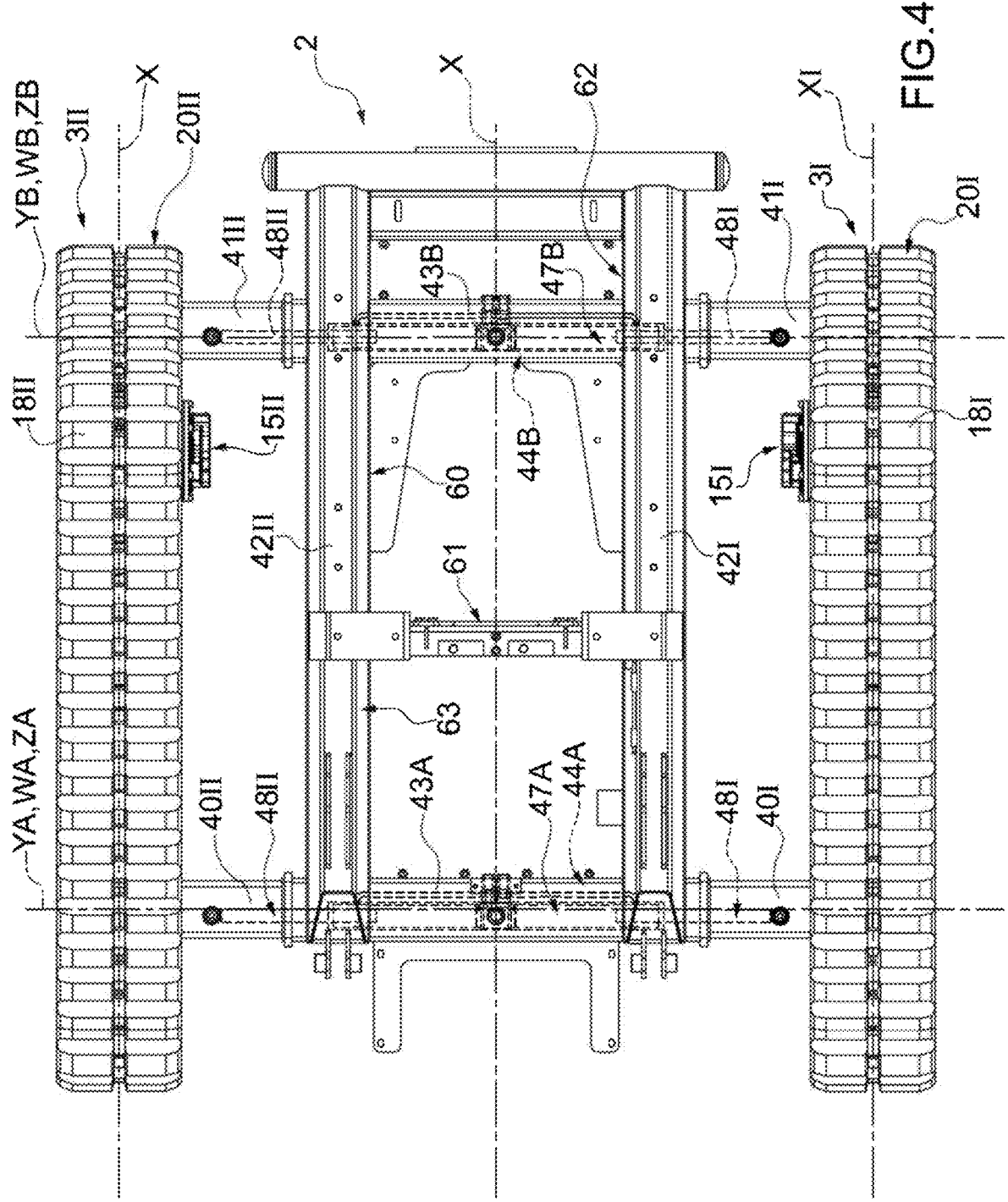

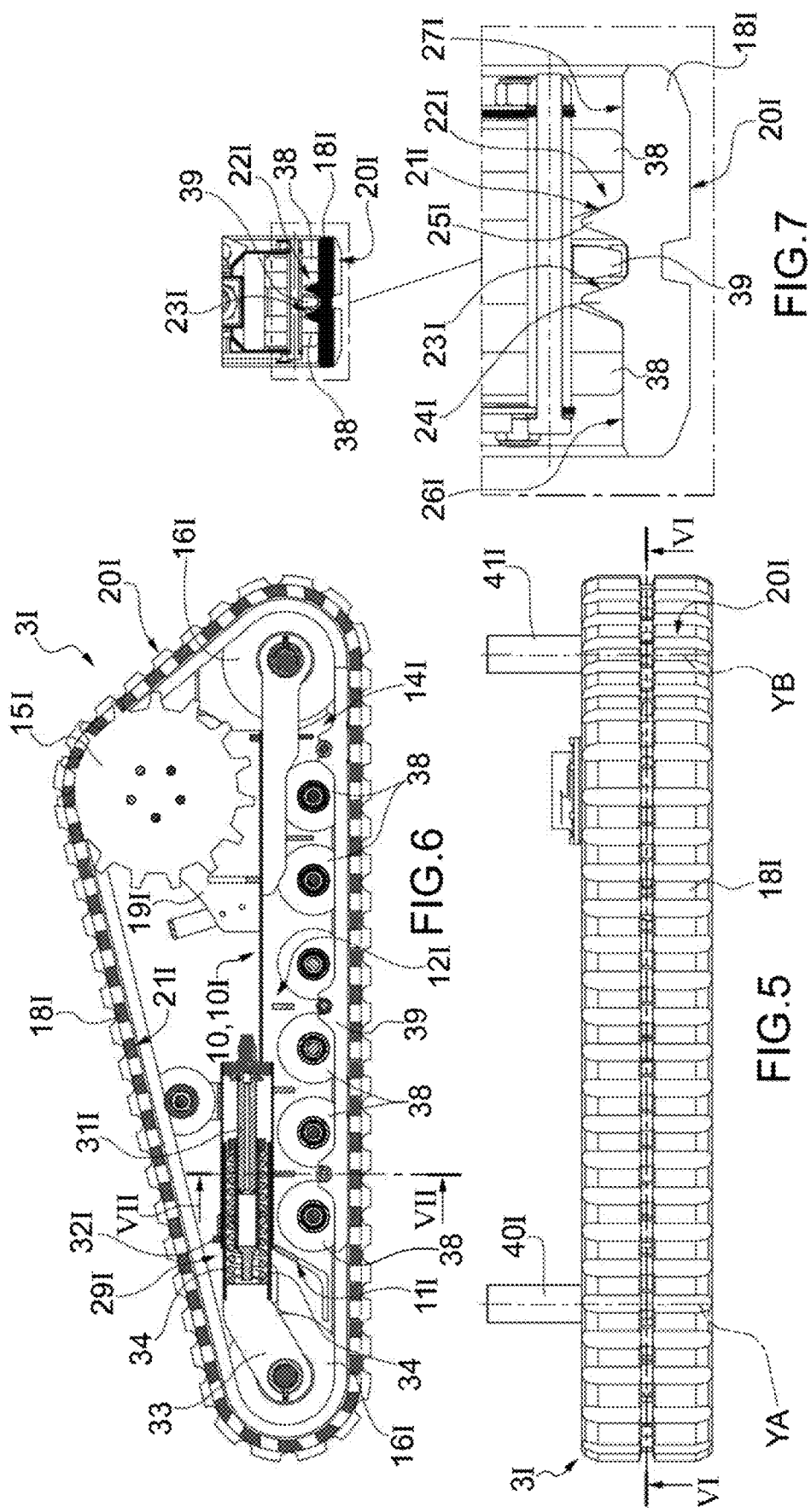

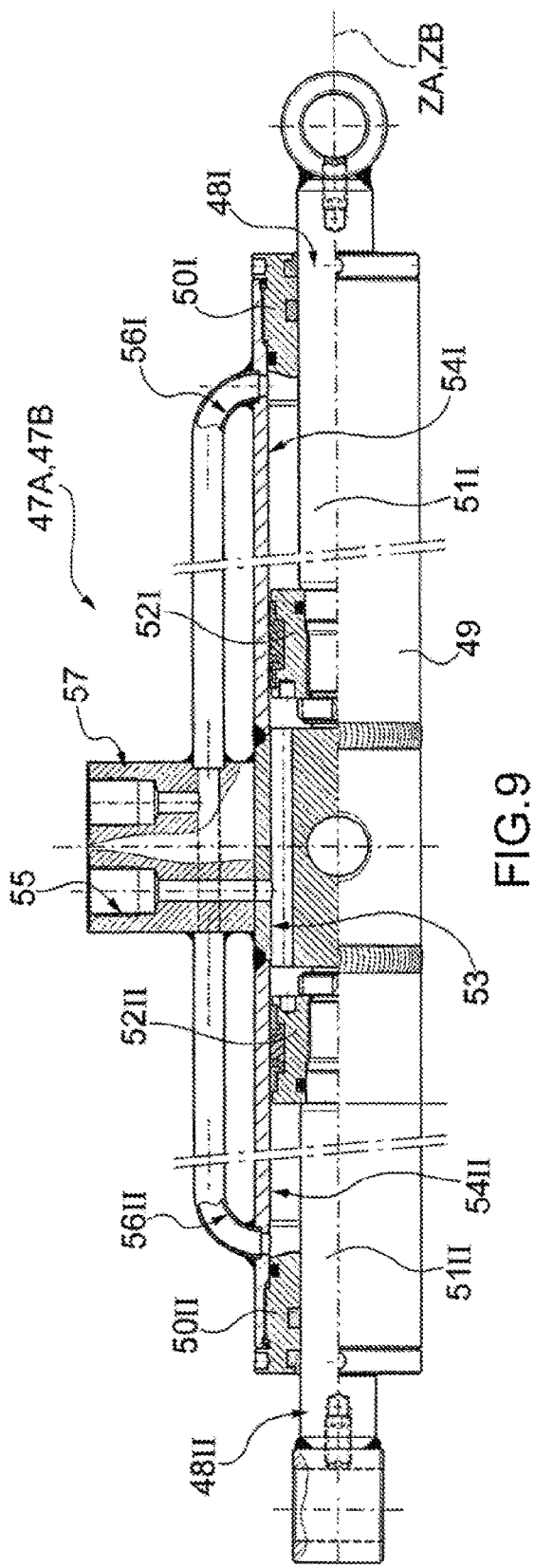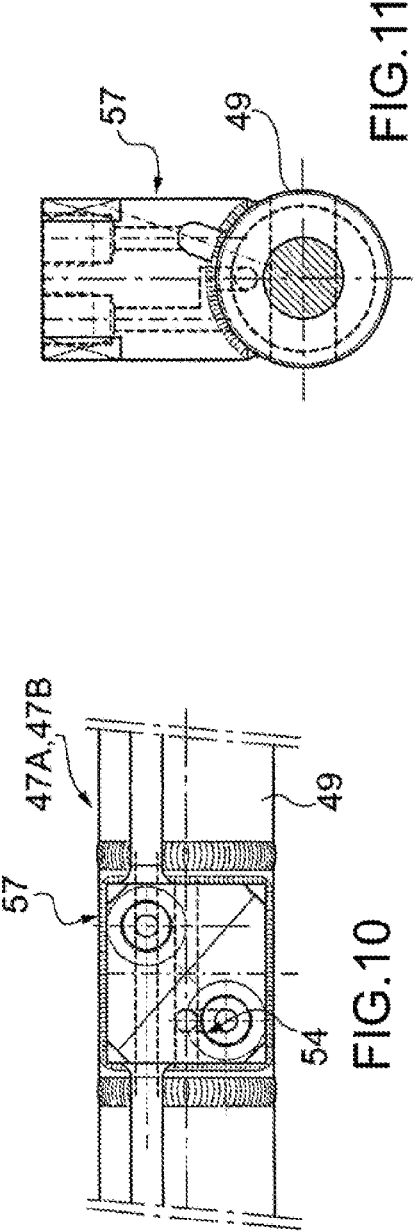

FRAME, UNDERCARRIAGE AND RADIO-CONTROLLED VEHICLE

PRIORITY CLAIM

This application claims priority from Italian Patent Application No. 102017000036800 filed on Apr. 4, 2017, the disclosure of which is incorporated by reference.

TECHNICAL FIELD

This patent application relates to an improved frame, an improved undercarriage and an improved radio-controlled vehicle.

In particular, the invention relates to an improved frame, an improved undercarriage and an improved radio-controlled vehicle, which can safely operate on slopes with extreme inclinations, for example inclinations exceeding 60°.

BACKGROUND ART

It is known to use radio-controlled vehicles for maintenance activities to be carried out in green areas in rough places, such as for example road and motorway edges. Known radio-controlled vehicles usually have a weight exceeding 1000 kg and risk rolling over in case of extreme slopes, which are further inaccessible to normal means.

Generally, radio-controlled vehicles comprise: a frame to support the motor and the other operating units, and two undercarriages, which are arranged on the sides of the frame and are provided with tracks, which transmit the motion to the ground so as to move the radio-controlled vehicle. Furthermore, known radio-controlled vehicles are operated by motors which, according to anti-pollution rules that are becoming stricter and stricter, in the next years will have to be replaced by other types of less polluting motors, such as for example common rail, turbo intercooler motors. However, common rail, turbo intercooler motors are larger and have greater weights than currently used motors and cannot be installed in existing vehicles, as their use would cause the rollover of the radio-controlled vehicle when it is being used, especially in case of extreme slopes.

In other words, existing frames and undercarriages are not suitable for the installation of larger and heavier motors and, therefore, cannot ensure the safety of the radio-controlled vehicle during the operation on extreme slopes (for example exceeding 60°).

In particular, known radio-controlled vehicles have the drawback that, during the execution of normal activities on extreme slopes, the tracks can come out of their seat, thus causing a series of troubles, such as the standstill of the machine and the interruption of the activities. Therefore, the operator is forced to reach the vehicle and fix the tracks putting them back into place. In these conditions the safety of the operator is subjected to a great risk, as the conditions of the ground on which the operator has to intervene are often very difficult and full of obstacles. This phenomenon obviously is stronger in case of installation of a larger and heavier motor, such as for example a common rail, turbo intercooler motor.

DISCLOSURE OF INVENTION

An object of the invention is to provide a frame which ensures the safety of the radio-controlled vehicle during the operation on extreme slopes, namely which can accommodate larger and heavier motors than the ones currently used (in particular, motors that are designed to fulfil anti-pollution requirements, such as for example common rail, turbo intercooler motors) and allows the centre of gravity of the radio-controlled vehicle to be lowered as much as possible, so as to increase the compactness and the stability thereof.

An object of the invention is to provide an undercarriage which ensures the safety of the radio-controlled vehicle during the operation on extreme slopes, namely which prevents the tracks from coming out of their seat.

An object of the invention is to provide a radio-controlled vehicle which ensures safety during the operation on extreme slopes and preferably is operated by a low-emission motor compliant with anti-pollution rules, such as for example a common rail, turbo intercooler motor.

According to the invention, there is provided a frame according to the appended claims.

According to the invention, there is provided an undercarriage according to the appended claims.

According to the invention, there is provided a radio-controlled vehicle according to the appended claims.

BRIEF DESCRIPTION OF THE DRAWINGS

The invention will now be described with reference to the accompanying drawings, which show a non-limiting embodiment thereof, wherein:

FIG. 4 is a plan view of the detail of FIG. 3;

FIG. 5 is a plan view of a first detail of the radio-controlled vehicle of FIG. 1;

FIG. 6 is a section according to line VI-VI of FIG. 5;

FIG. 7 is a section according to lines VII-VII of FIG. 6;

FIGS. 9 to 11 are respective partially sectional, lateral and plan views of a further detail of the radio-controlled vehicle of FIG. 1.

BEST MODE FOR CARRYING OUT THE INVENTION

Figure 1:
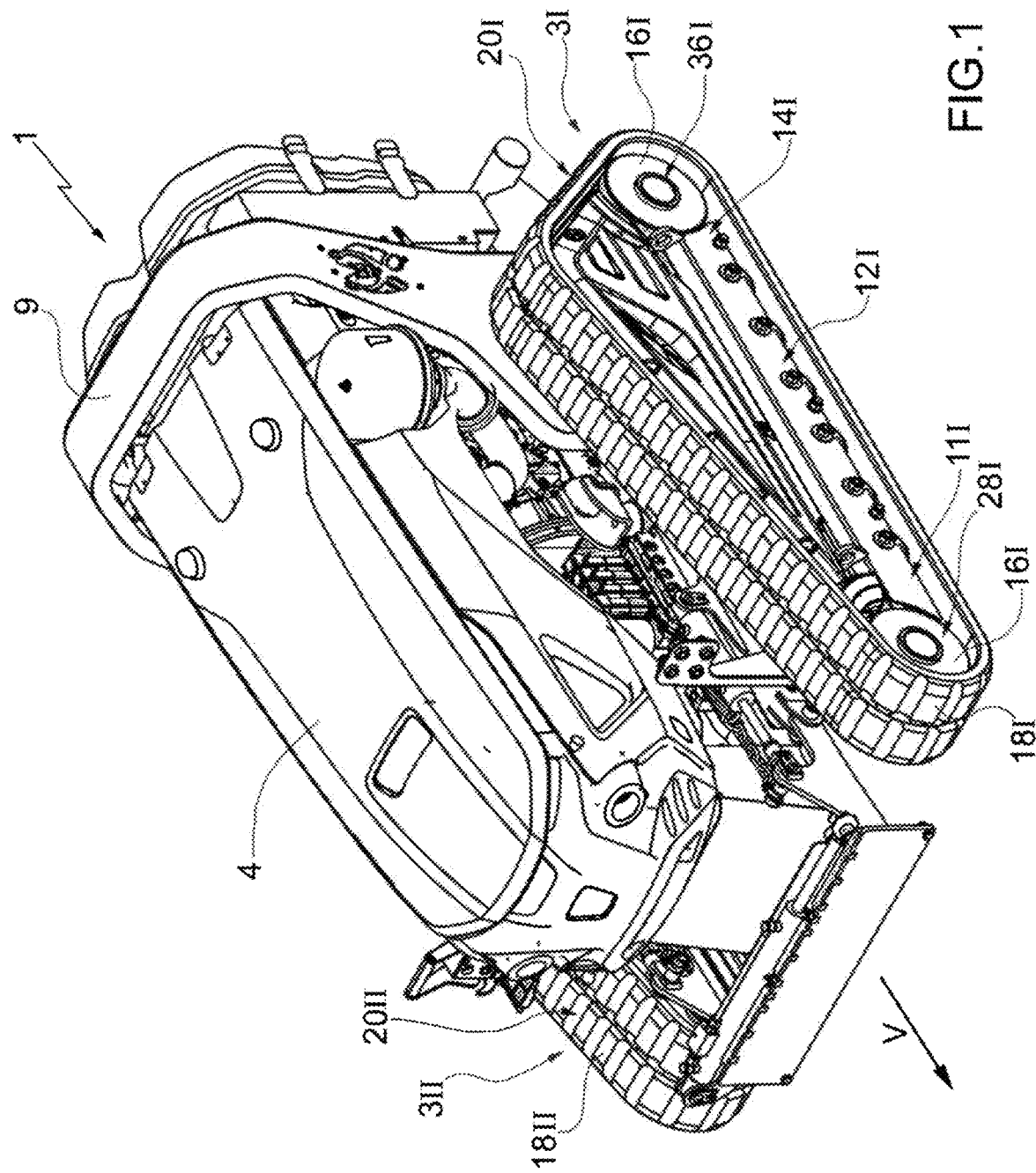
FIG. 1 is a perspective view of a radio-controlled vehicle according to the invention.

In FIG. 1, number 1 indicates, as a whole, a radio-controlled vehicle comprising a frame 2, a left undercarriage 3I and a right undercarriage 3II. Advantageously, the radio-controlled vehicle 1 is configured, as explained more in detail below, so as to ensure a correct operation even on extreme slopes, namely on slopes exceeding 60°.

Hereinafter, the terms front, rear, right and left will be used with reference to the moving direction v of the radio-controlled vehicle 1 when driving forward. In order to distinguish two substantially equal components, hereinafter, the components on the left of the symmetry plane of the radio-controlled vehicle 1 are indicated with suffix I, whereas the components on the right are indicated with suffix II. Similarly, the front components are indicated with suffix A and the rear components are indicated with suffix B.

Figure 2:
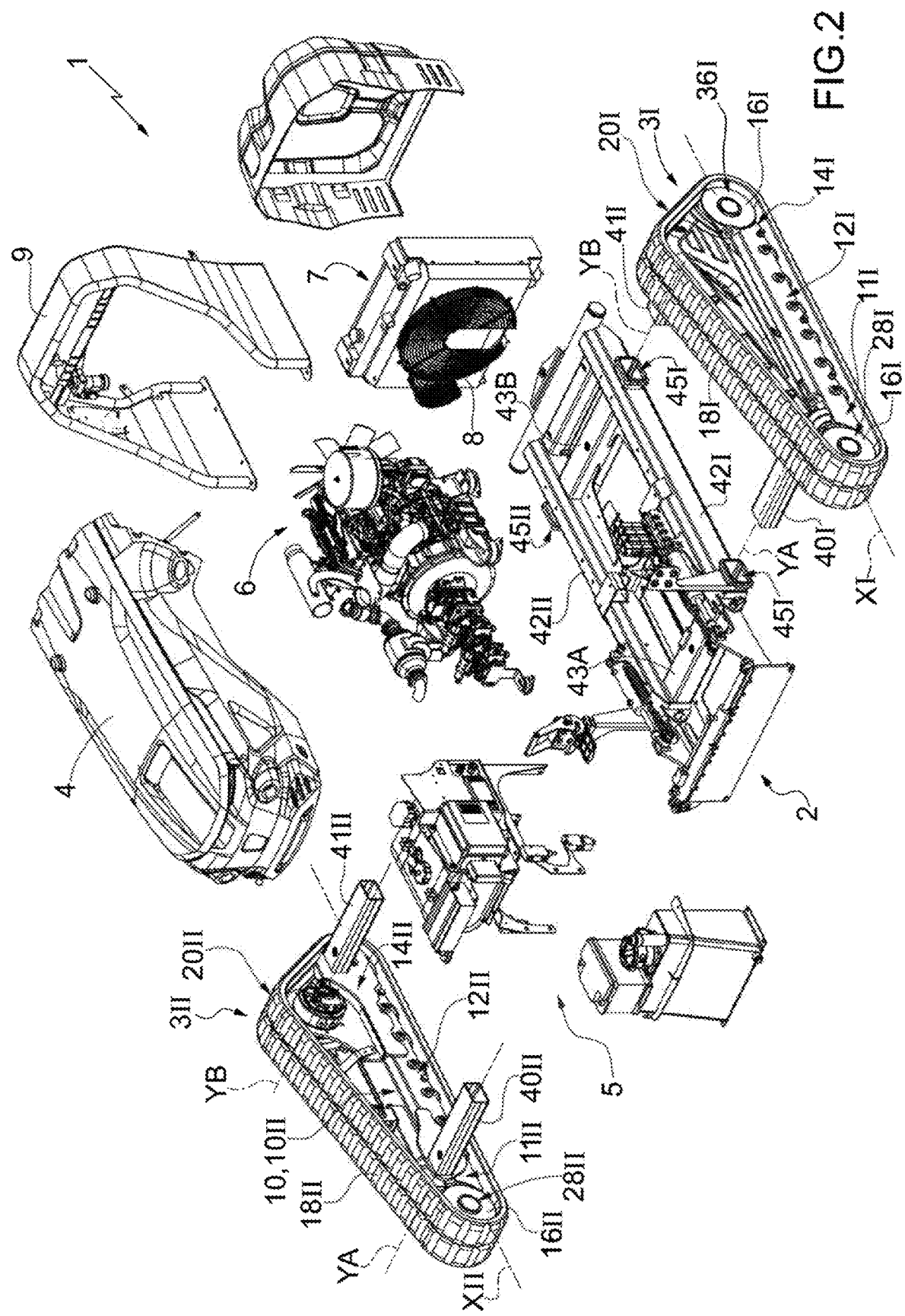
FIG. 2 is an exploded view of the radio-controlled vehicle of FIG. 1.

FIG. 2 is an exploded view of the radio-controlled vehicle 1 of FIG. 1. The radio-controlled vehicle 1 comprises, in a known manner, a body 4, a hydraulic assembly 5, a motor 6, a radiator 7. Preferably, the radiator 7 comprises, in turn, a reversible fan 8. Advantageously, the radio-controlled vehicle comprises a rollbar 9, which is fitted around the body 4 and is configured to protect the radiator 7 and the reversible fan 8 against external hits.

Advantageously, the motor 6 is a common rail, turbo intercooler motor. The motor 6 is arranged at the front relative to the radiator 7.

Figure 3:
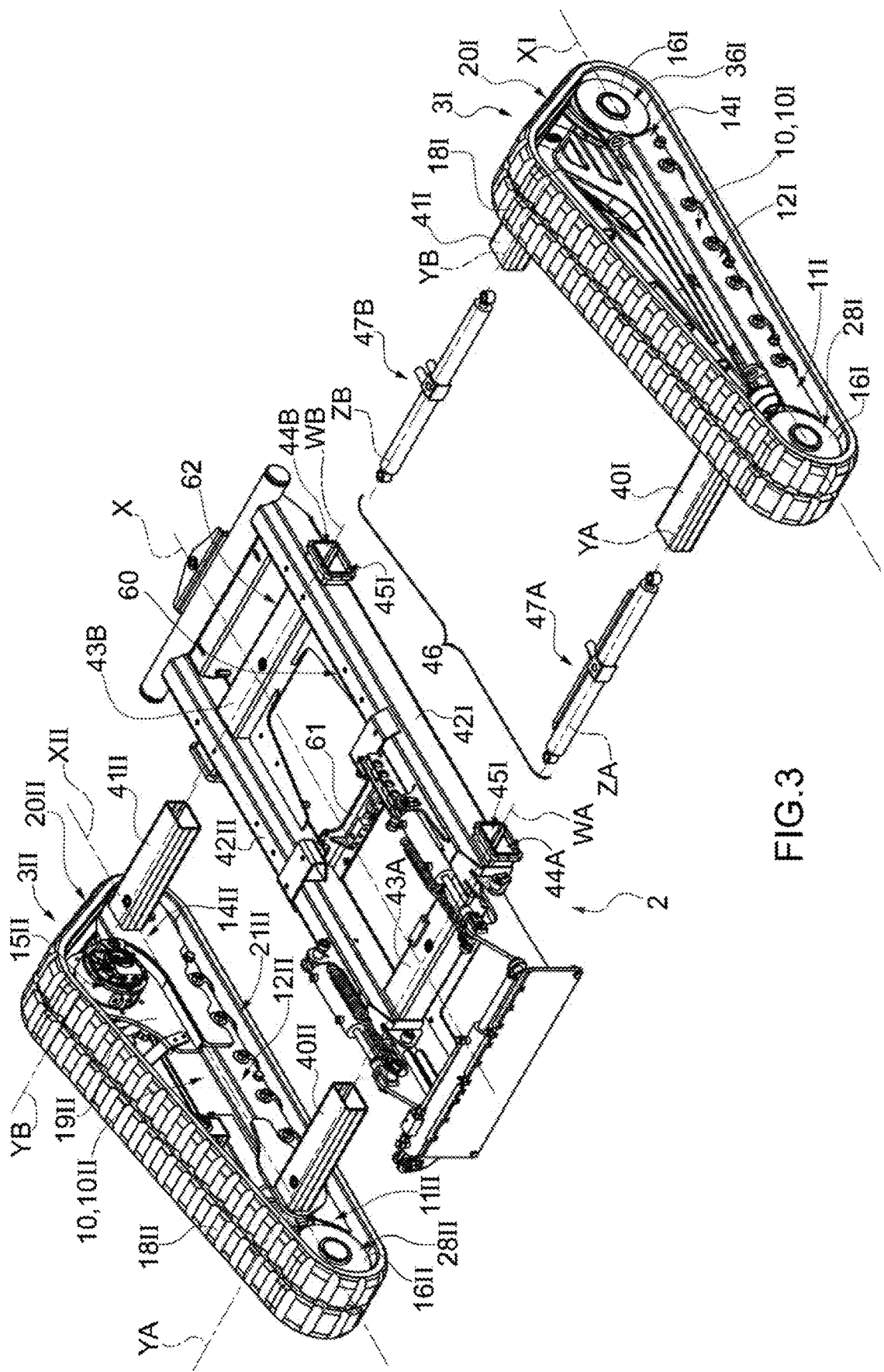
FIG. 3 shows a detail of FIG. 2.
Figure 8:
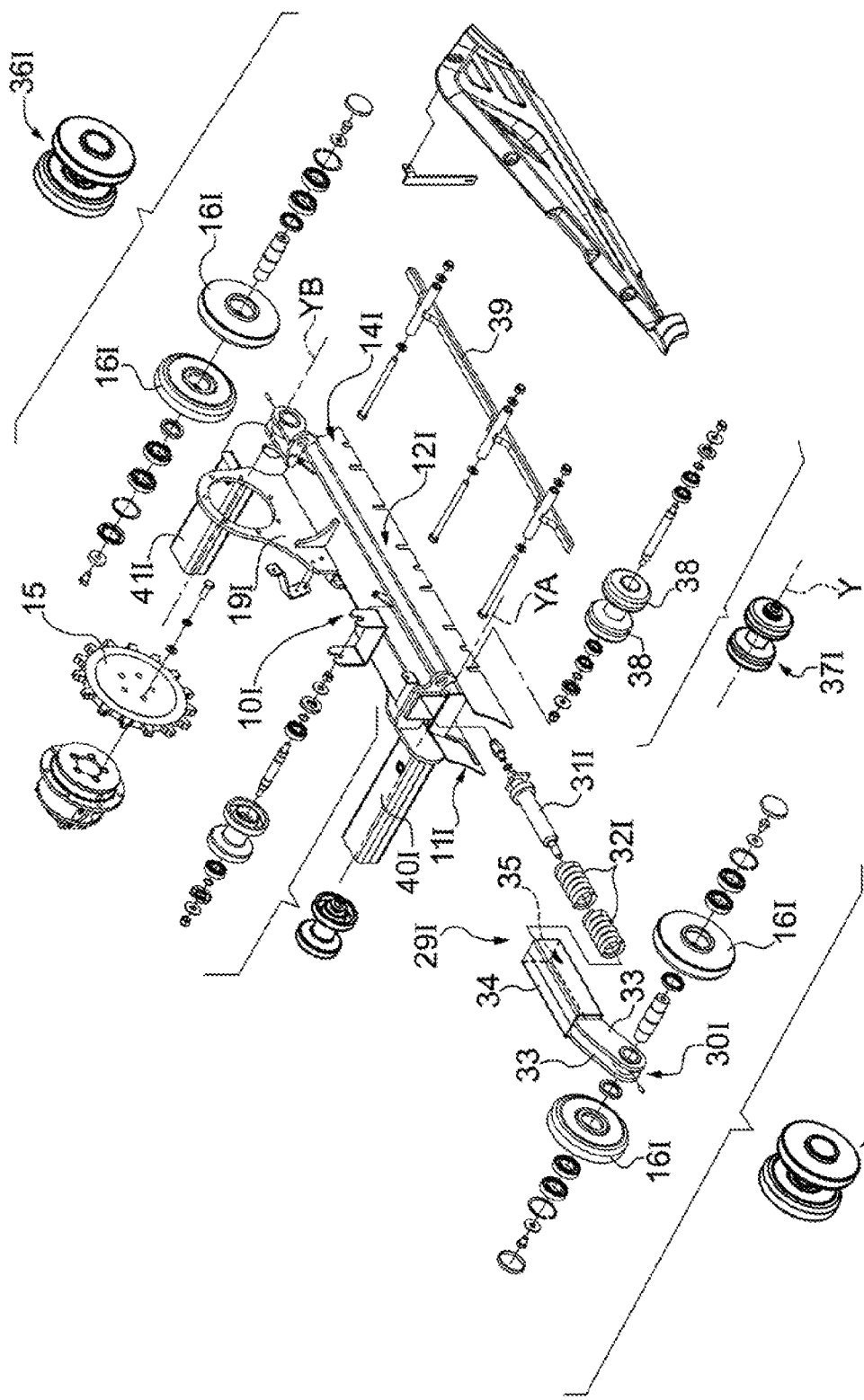
FIG. 8 is an exploded view of a detail of FIG. 5.

FIGS. 3 and 4 show a detail of FIG. 2, in particular the assembly consisting of the frame 2, the left undercarriage 3I and the right undercarriage 3II, as explained more in detail below.

FIGS. 5 to 8 show in detail a left undercarriage 3I. The components of the right undercarriage 3II are substantially equal to and mirror-like relative to the ones of the left undercarriage 3I. Each undercarriage 3I, 3II, in use, transfers to the ground the driving motion generated by the motor 6.

Each undercarriage 3I, 3II comprises a support structure 10I, 10II, which has a longitudinal axis XI, XII and is configured to be connected to the frame 2 and to support all the operating units of the undercarriage, as explained more in detail below. According to FIG. 8, the support structure 10I, 10II is divided, along the longitudinal axis XI, XII, into a front portion 11I, 11II, a central portion 12I, 12II and a rear portion 14I, 14II.

Furthermore, each undercarriage 3I, 3II comprises a driving wheel 15I, 15II, a plurality of idlers 16I, 16II and a track 18I, 18II, which is fitted around the idlers 16I, 16II and the driving wheel 15I, 15II. The driving wheel 15I, 15II meshes with the track 18I, 18II and operates the track in a known manner. In particular, the driving wheel 15I, 15II is hydraulically operated.

The support structure 10 comprises a bracket 19I, 19II to support the driving wheel 15I, 15II and arranged in the area of a central portion 12I, 12II of the support structure 10I, 10II.

The track 18I, 18II has a closed band body and comprises an outer surface 20I, 20II, which, in use, comes into contact with the ground, and an inner surface 21I, which, in use, comes into contact with said idlers 16I, 16II and said driving wheel 15I, 15II.

Tracks 18I, 18II are similar to each other, the following features are valid for both tracks, in the figures it is illustrate or conciseness only track 18I (the following features are valid also for track 18II). The track 18I, 18II further comprises an annular projection 22I which radially projects from said inner surface 21I towards the inside of the track 18I, 18II. In particular, the annular projection 22I has an annular housing 23I, which is laterally delimited by two lateral abutment walls, hereinafter indicated with inner abutment wall 24I and outer abutment wall 25I, 25II.

The annular projection 22I has an inner profile with a substantially V-shaped cross section.

The annular projection 22I divides the inner surface 21I of the track 18I, 18II into two bands, hereinafter indicated with inner band 26I and outer band 27I, 27II.

The inner band 26I and the outer band 27I, 27II are substantially parallel and equal to one another. In other words, the annular projection 22I engages an annular central portion of the inner surface 21I of the track 18I, 18II.

Advantageously, each undercarriage 3I, 3II comprises a pair of front idlers 28I, 28II, which are coaxial to one another relative to an axis which is transverse, substantially perpendicular, to the longitudinal axis of the undercarriage.

Each front idler engages a respective band of the track 18I, 18II. The pair of front idlers 28I, 28II is connected to the front portion 11I, 11II of the support structure 10. Advantageously, the pair of front idlers 28I, 28II is connected to the front portion 11I, 11II of the support structure 10 by means of a tensioner system 29I, which can be adjusted so as to change the tension of the track 18I, 18II.

In particular, the tensioner system 29I comprises a fork 30I, which is connected to the pair of front idlers 28I, 28II, a hydraulic cylinder 31I, which connects the fork 30I to the front portion 11I, 11II of the support structure 10, and elastic return elements 32I, which act between the fork 30I and the hydraulic cylinder 31I. The hydraulic cylinder 31I is configured to change the pre-load of the elastic return elements 32I upon the fork 30I.

The fork 30I comprises two arms 33, which are connected in a known manner to the pair of front idlers 28I, 28II, and a hub 34 having an inner cavity 35, where the hydraulic cylinder 31I is arranged. In particular, the elastic return elements 32I are helical springs fitted around the hydraulic cylinder 31I so as to form the tensioner system 29 at least partially housed inside the hub 34. The hydraulic cylinder 31I, in the area of an end of its, is connected to the support structure 10I, 10II.

Each undercarriage 3I, 3II further comprises a pair of rear idlers 36I, which are coaxial to one another relative to an axis which is transverse, substantially perpendicular, to the longitudinal axis of the undercarriage. Each rear idler engages a respective band of the track 18I, 18II. The pair of rear idlers 36I is connected to the rear portion 14I, 14II of the support structure 10.

Each undercarriage 3I, 3II further comprises a plurality of stabilization rollers 37I, which are connected to the central portion 12I, 12II of the support structure 10I, 10II. The pairs of stabilization rollers 37I are interposed, along the longitudinal axis XI, XII, between the pair of front idlers 28I, 28II and the pair of rear idlers 36I.

Each pair of stabilization rollers 37I comprises a pair of rollers 38, which are coaxial to one another relative to an axis Y which is transverse, substantially perpendicular, to the longitudinal axis XI, XII of the support structure 10I, 10II. Each roller 38 engages a respective band 26I, 27I of the track 18I, 18II. In particular, the pairs of stabilization rollers 37I engage a section of the track 18I, 18II in contact with the ground.

Each undercarriage 3I, 3II further comprises an anti-derailment plate 39, which is connected to said support structure 10I, 10II and, in use, projects into the annular housing 23 of the annular projection 22I, substantially between the inner abutment wall 24I and the outer abutment wall 25I.

In particular, the anti-derailment plate 39 is connected to the central portion 12I, 12II of the support structure 10I, 10II and lies between the rollers 38 of each pair of stabilization rollers 37I.

Each undercarriage 3I, 3II further comprises a front slide 40I, 40II and a rear slide 41I, 41II, which are connected to the support structure 10I, 10II. The front slide 40I, 40II and the rear slide 41I, 41II transversely project from a same side of the support structure 10I, 10II. Each slide 40I, 40II, 41I, 41II has a hollow tubular body 49 with a longitudinal axis YA and YB, respectively, which is transverse, substantially perpendicular, to the longitudinal axis XI, XII of the support structure 10I, 10II. Each slide 40I, 40II, 41I, 41II is configured to be coupled, in use, to a respective guide of the frame 2 of the radio-controlled vehicle 1, as explained more in detail below.

Advantageously, the bracket 19I, 19II of the driving wheel 15I, 15II is interposed between the pair of front idlers 28I, 28II and the pair of rear idlers 36I. In particular, the bracket 19I, 19II for said driving wheel 15I, 15II is interposed, along the longitudinal axis XI, XII of the support structure 10I, 10II, between the front slide 40I, 40II and the rear slide 41I, 41II.

Therefore, the track 18I, 18II of each undercarriage 3I, 3II follows a triangular path. In this way, the stability of the radio-controlled vehicle 1 increases, as the centre of gravity is located between the pair of front idlers 28I, 28II and the pair of rear idlers 36I.

FIGS. 3 and 4 show in detail the assembly consisting of the frame 2, the left undercarriage 3I and the right undercarriage 3II.

According to FIGS. 3 and 4, the frame 2 has a longitudinal axis X, which substantially lies on a symmetry plane of the radio-controlled vehicle 1. The frame 2 comprises a left longitudinal member 42I, a right longitudinal member 42II, a front guide 43A and a rear guide 43B.

The front guide 43A and the rear guide 43B connect the left longitudinal member 42I and the right longitudinal member 42II to one another in a transverse, substantially perpendicular manner.

Each guide 43A, 43B is a tubular body 49 having an inner cavity 44A, 44B and a longitudinal axis WA, WB. Each guide 43A, 43B is connected to the right and left longitudinal member so as to be transverse, substantially perpendicular, to the longitudinal axis of the frame 2.

Each guide 43A, 43B has a left opening 45I and a right opening 45II, which establish a communication between the respective cavity 44A, 44B and the outside in the area of a left end and of a right end, respectively, of each guide 43A, 43B.

The front slide 40I, 40II and the rear slide 41I, 41II of the left undercarriage 3I are coupled in a sliding manner to the front guide 43A and to the rear guide 43B, respectively, of the frame 2. In particular, the front slide 40I, 40II is inserted into the left opening 45I of the front guide 43A and the rear guide 41I, 41II is inserted into the left opening 45I of the rear guide 43B.

The front slide 40I, 40II and the rear slide 41I, 41II of the right undercarriage 3II are coupled in a sliding manner to the front guide 43A and to the rear guide 43B, respectively, of the frame 2. In particular, the front slide 40I, 40II is inserted into the right opening 45II of the front guide 43A and the rear guide 41I, 41II is inserted into the right opening 45II of the rear guide 43B.

Advantageously, the frame 2 comprises an adjustment unit 46, which is configured to adjust the relative position between the left undercarriage 3I and the frame 2 and, similarly, between the right undercarriage 3II and the frame 2.

According to FIG. 3, the adjustment unit 46 comprises a front cylinder 47A, which is housed inside the front guide 43A, and a rear cylinder 47B, which is housed inside the rear guide 43B. Each cylinder 47A, 47B comprises two pistons, which are operated simultaneously, so as to operate both the left undercarriage 3I and the right undercarriage 3II. In particular, each cylinder 47A, 47B comprises a left piston 48A and a right piston 48II. Each piston 48I, 48II can selectively project out of the respective left opening 45I or right opening 45II of the corresponding guide 43A, 43B, as explained more in detail below.

According to FIGS. 9 to 11, each cylinder 47A, 47B comprises a tubular body 49 having a longitudinal axis ZA, ZB and is a double-acting cylinder. In particular, each cylinder 47A, 47B is configured to simultaneously operate two opposite pistons 48I, 48II. In particular, each cylinder 47A, 47B comprises two cylinder-heads 50I, 50II opposite one another, each fixed to a respective end of the tubular body 49.

Each piston 48I, 48II comprises a rod 51, which is mounted so as to slide, in a known manner, through a respective cylinder-head 50I, 50II. Each piston 48I, 48II comprises a head 52I, 52II, which is fixed to an inner end of the rod 51I, 51II and can slide, in a fluid-tight manner, inside the tubular body 49. In particular, the right piston 48II comprises a right rod 51I, 51II, which is mounted so as to slide through the right cylinder-head 50II. Similarly, the left piston 48I comprises a left rod 51, which is mounted so as to slide through the left cylinder-head 50I. The heads 52II of the right piston 48II and the head 52I of the left piston 48I, respectively, are arranged beside one another so as to delimit, inside the cavity of the cylinder, an inner chamber 53.

The head 52I of the left piston 48I laterally delimits, with the respective cylinder-head 50I, a left chamber 54I with a variable volume, based on the position of the left piston 48I along the respective axis ZA, ZB.

The head 52II of the right piston 48II laterally delimits, with the respective cylinder-head 50II, a right chamber 54II with a variable volume, in function of the position of the right piston 48II along the respective axis ZA, ZB.

Each cylinder 47A, 47B further comprises a primary duct 55, which is configured to introduce oil into the inner chamber 53.

Each cylinder 47A, 47B comprises, furthermore, a pair of secondary ducts 56I, 56II, each configured to introduce oil into the left chamber 54I and, respectively, into the right chamber 54II.

Each cylinder 47A, 47B further comprises a valve element 57, which is configured to deflect the oil flow between the primary duct 54 and the secondary ducts 56I, 56II, and vice versa. By so doing, the oil can be selectively and alternatively directed between the inner chamber 53 and the right 51I and left chamber 54II, thus causing the movement of each piston 48I, 48II along the longitudinal axis ZA, ZB. FIGS. 9 to 11 show an example of a valve element 57, which of course can be replaced by equivalent systems, which, in particular, are suited to deflect the flow of a fluid from a duct 55 (56I, 56II) to the other one 56I, 56II (55) and to enable the selective emptying of the chambers 53, 55 of the cylinder.

Each rod 51 of each cylinder 47A, 47B is configured to extend through a respective slide of a corresponding undercarriage. Each rod 51 is configured to extend through the respective guide and the respective slide, so as to cause the movement of a corresponding undercarriage transversely, in particular perpendicularly, to the longitudinal axis X of the frame 2. Therefore, by selectively operating each cylinder 47A, 47B, it is possible to adjust the relative position between each undercarriage 3I, 3II and the frame 2. In this way, depending on the slope of the ground, the base of support of the radio-controlled vehicle 1 can be changed so as to increase the stability of the radio-controlled vehicle 1.

According to FIGS. 3 and 4, the frame 2 comprises a motor housing 60. Advantageously, the motor housing 60 is interposed, along the longitudinal axis X of the frame 2, between the front guide 43A and the rear guide 43B. According to FIGS. 3 and 4, the frame 2 comprises a division bar 61 and the motor housing 60 is laterally delimited by a respective portion of the left longitudinal member 42I and of the right longitudinal member 42II, by the rear guide 43B and by the division bar 61.

In particular, the motor housing 60 is in a front position relative to the rear guide 43B.

The frame 2 further has a radiator housing 62, which is configured to house a radiator 7. Advantageously, the rear guide 43B is interposed, along the longitudinal axis of the frame 2, between the motor housing 60 and the radiator housing 62. In particular, the radiator housing 62 projects at the back relative to the rear guide 43B.

The frame 2 comprises, furthermore, a hydraulic assembly housing 63, which is arranged at the front relative to the motor housing 60. In other words, the hydraulic assembly housing 63 is interposed between the division bar 61 and the front guide 43A.

Advantageously, the radio-controlled vehicle 1 comprises a common rail, turbo intercooler motor 6.

Advantageously, the motor 6 is installed at the centre relative to the frame 2, namely between the front guide 43A and the rear guide 43B. Therefore, the stability of the radio-controlled vehicle 1 is increased relative to known radio-controlled vehicles where the motor is installed in a projecting manner.

Advantageously, the radiator 7 with the reversible fan 8 is arranged at the back of the motor 6, relative to the longitudinal axis X of the frame 2.

Advantageously, the rollbar 8 is installed at the back of the motor 6 and is fitted around the radiator 7 and the reversible fan 8. The rollbar 9, besides protecting the body 4, is configured to protect the radiator 7 and the reversible fan 8.

Advantageously, the radio-controlled vehicle 1 described above has an entire configuration, namely a combination between the arrangement of the components of the undercarriages and of the frame 2, which is such as to reduce the height and lower the position of the motor 6 relative to traditional radio-controlled vehicles. Furthermore, the arrangement of all the components of the radio-controlled vehicle 1 allows the motor 6 to be installed in a central position, this increasing the stability of the vehicle.

Advantageously, the adjustment unit 46 enables an adjustment of the relative position between the left undercarriage 3I and the frame 2 and, similarly, between the right undercarriage 3II and the frame 2. By so doing, the base of support of the radio-controlled vehicle 1 can e changed depending on the relative use conditions, so as to increase its stability.

Advantageously, the fact that the adjustment unit 46 comprises cylinders with a double rod 51, which are arranged inside one single guide, allows the operating elements of the undercarriages 3I, 3II to be compacted inside the front guide 43A and the rear guide 43B, respectively. In this way, the space taken up by the adjustment unit 46 can be minimized and the protection of the cylinders 47 can be increased, as they are completely contained inside the respective slides and guides. Thanks to the reduction of the dimensions of the adjustment unit 46, the housings described above can be obtained in the frame 2. These housings allow the motor 6 and the radiator 7 to be positioned in lower positions, namely closer to the ground, compared to traditional radio-controlled vehicles. Furthermore, the motor housing 60 can have sizes that allow it to accommodate motors that are larger than the motors traditionally used in these vehicles, such as for example a common rail, turbo intercooler motor.

Therefore, the frame 2 described above, besides being more compact and protecting the adjustment unit 46 from dirt or the like, allows the motor 6 to be housed in a lower position, thus increasing the stability of the radio-controlled vehicle 1. Furthermore, the particular compactness of the front guides 43A and of the rear guides 43B of the frame 2 allows motors to be housed, which have sizes that are larger than those of the motors traditionally used in known radio-controlled vehicles, such as for example a common rail, turbo intercooler motor.

Moreover, the central position of the motor 6, namely the position of the motor 6 between the front guide 43A and the rear guide 43B, relative to the longitudinal axis of the frame 2, increases the stability of the radio-controlled vehicle 1 compared to known radio-controlled vehicles where the motor is arranged at the back and projects. In addition, the central position of the motor 6 also affects the configuration of the left undercarriage 3I and of the right undercarriage 3II.

Indeed, thanks to the central position of the motor 6, the driving wheel 15I, 15II of the undercarriage can be arranged between the pair of front idlers 28I, 28II and the pair of rear idlers 36I. In this way, the compactness and the stability of each undercarriage 3I, 3II are increased.

Furthermore, the anti-derailment plate 39 arranged inside the annular projection 22I of each track 18I, 18II forbids the derailment of the track 18I, 18II. In case of extreme slopes, the anti-derailment plate 39 comes into contact with the outer annular abutment wall or the inner annular abutment wall, thus bringing the track 18I, 18II back to its ordinary use position.

Therefore, the radio-controlled vehicle 1 described above ensures a safe operation even on extreme slopes, for example on slopes exceeding 60°, and enables the installation of larger and heavier motors than the motors currently used in known radio-controlled vehicles.

The invention claimed is:

1. A radio-controlled vehicle comprising: a frame, a motor and a radiator; wherein the frame has a longitudinal axis and comprising a left longitudinal member, a right longitudinal member, wherein the frame further comprises, a front guide and a rear guide, which transversely connect said right longitudinal member and left longitudinal member to one another; wherein each guide is a tubular body having an inner cavity and a longitudinal axis; wherein each guide is connected to the left longitudinal member and to the right longitudinal member so as to be transverse to said longitudinal axis of the frame, wherein each guide has a left opening and a right opening, which establish a communication between the respective cavity and the outside in the area of a right end and a left end, respectively, of each guide; wherein the frame comprises an adjustment unit, which comprises, in turn, a first cylinder housed inside the front guide and a second cylinder housed inside the rear guide; wherein each cylinder comprises a plurality of rods, each capable of sliding and selectively projecting outwards from the respective guide through said left opening or said right opening; wherein the frame has a first housing, which houses said motor; wherein said first housing is interposed, along the longitudinal axis of the frame, between the front guide and the rear guide; wherein the frame comprises a second housing, which houses said radiator; and wherein the rear guide is interposed, along the longitudinal axis of the frame, between said first and said second housing, the radio-controlled vehicle being radio-controlled.

2. The radio-controlled vehicle according to claim 1, wherein each cylinder is a double-acting cylinder and comprises two pistons, each comprising a rod and a head; wherein the pistons are mounted so as to axially slide through said cylinder and are mounted so that said heads face one another; wherein each cylinder comprises an inner chamber, which is delimited by the heads of the pistons forming a left chamber and a right chamber, which are delimited between the tubular body of the cylinder and a left head and a right head of said heads, respectively.

3. The radio-controlled vehicle according to claim 1, wherein the adjustment unit is connected to the frame between the left longitudinal member and the right longitudinal member.

4. The radio-controlled vehicle according to claim 1, wherein, by selectively operating each of the first and second cylinder, the relative position between a first undercarriage and a second undercarriage, respectively, and the frame is adjusted so that depending on a slope of the ground, a base of support of the radio-controlled vehicle can be changed to ensure correct operation on slopes exceeding 60°.

5. The radio-controlled vehicle according to claim 4, wherein, by selectively operating each of the first and second cylinder, the relative position between a first undercarriage and a second undercarriage, respectively, and the frame is adjusted so that depending on a slope of the ground, a base of support of the radio-controlled vehicle can be changed to ensure correct operation on slopes exceeding 60° in green areas in rough places such as road and motorway edges.

* * * * *